United States Patent [19]

Louttit

[11] Patent Number: 4,513,443
[45] Date of Patent: Apr. 23, 1985

[54] RADIO RECEIVER SUITABLE FOR USE IN A SPACED CARRIER AREA COVERAGE SYSTEM

[75] Inventor: Duncan R. Louttit, Cambridge, England

[73] Assignee: U.S. Philips Corporation, New York, N.Y.

[21] Appl. No.: 612,995

[22] Filed: May 21, 1984

Related U.S. Application Data

[63] Continuation of Ser. No. 340,161, Jan. 18, 1982, abandoned.

[30] Foreign Application Priority Data

Feb. 4, 1981 [GB] United Kingdom ............... 8103413

[51] Int. Cl.³ .................. H04B 7/24; H04B 1/26; H03J 7/18
[52] U.S. Cl. ...................... 455/52; 455/62; 455/165; 455/166
[58] Field of Search .............. 455/52, 62, 161, 165, 455/166, 168, 169, 194, 196

[56] References Cited

U.S. PATENT DOCUMENTS

| | | | |
|---|---|---|---|
| 3,673,499 | 6/1972 | Avins et al. | 455/205 |
| 3,983,492 | 9/1976 | Fisher et al. | 455/62 |
| 4,069,455 | 1/1978 | Sherman | 455/196 |
| 4,197,500 | 4/1980 | Klein et al. | 455/62 |
| 4,380,826 | 4/1983 | Usugi | 455/165 |
| 4,387,469 | 6/1983 | Miyazaki et al. | 455/161 |
| 4,419,766 | 12/1983 | Goeken et al. | 455/62 |
| 4,430,753 | 2/1984 | Shiratani | 455/52 |

Primary Examiner—Marc E. Bookbinder
Attorney, Agent, or Firm—Thomas A. Briody; William J. Streeter

[57] ABSTRACT

A radio receiver suitable for use in a spaced carrier area coverage system in which two or more carriers are transmitted.

In order to reduce the overall noise which is present in existing systems and to enable carriers to be spaced more regularly and/or closer, the radio receiver is adapted to measure the strength of each signal, in turn, and to determine which of the received signals has the greatest strength. A local oscillator, conveniently in the form of a frequency synthesizer is adjusted so that the output frequency to the mixer of the RF section is such as to enable the signal having the greatest strength to be received. The system remains locked on to the selected signal unless or until the incoming signal decreases in amplitude by more than a predetermined amount. If this occurs, the scanning sequence is repeated to find the signal having the greatest strength, but in the event of all the signals scanned not being greater than a minimum squelch threshold value, then a squelch signal is produced which inhibits the audio frequency section of the receiver. In this latter case the receiver remains in stand-by mode.

5 Claims, 6 Drawing Figures

RADIO RECEIVER SUITABLE FOR USE IN A SPACED CARRIER AREA COVERAGE SYSTEM

This is a continuation of application Ser. No. 340,161, filed Jan. 18, 1982, now abandoned.

BACKGROUND OF THE INVENTION

A radio receiver suitable for use in a spaced carrier area coverage system. The radio receiver may be used with an area coverage system for land mobiles and in a conceivable maritime area coverage system.

Spaced carrier area coverage systems are used where it is desired to transmit a signal to, say, a vehicle moving within an area and which signal, if transmitted from a single aerial, could be subject to extensive fading or loss at the receiver. In a known amplitude modulated spaced carrier area coverage system, typically three aerials are located at vantage points within the area to be covered. Each aerial is associated with its own transmitter which transmits a signal on its respective carrier wave. The frequencies of these carrier waves are chosen so that all the signals including their sidebands fall substantially within a 25 kHz channel. The narrow bandwidth modulation signals have to be synchronized so that they are all in phase. The selection of the frequencies of the carrier waves is such that the primary, secondary and subsequent beat notes fall outside the audio bandwidth, typically 200 Hz to 3 kHz, of the receiver.

In order to receive the signal, the known receiver has an IF noise bandwidth (that is the passband between the ±3 dB points) of typically 20 kHz so that it is able to receive all three carrier signals and at least one sideband of each carrier. Because of this wide bandwidth the receiver picks up unwanted noise. Trying to select any one of these carriers by having say three channel filters each with a response of ±3.75 kHz, instead of having a single channel filter with a response of ±10 kHz, and switching between these filters may cause problems of, for example intermodulation. Furthermore, such additional channel filters are undesirable because channel filters are regarded as being an expensive part of the receiver circuitry.

An alternative area coverage system which operates within a 12.5 kHz channel is termed a quasi-synchronous system in which several transmitters, for example three transmitters, operate at different but very closely related frequencies, the differences being less than 10 Hz. While the system works in principle, there are subjective problems due to the very low frequency beating of the transmitter carrier waves and the very high frequency stability requirements of these transmitters relative to one another.

SUMMARY OF THE INVENTION

An object of the invention is to provide a radio receiver suitable for use in a spaced carrier area coverage system which has an improved signal-to-noise ratio.

According to the present invention there is provided a radio receiver suitable for use in a spaced carrier area coverage system including at least two transmitters transmitting different carrier waves within an overall channel, the radio receiver comprising an RF section including a mixer, a channel filter coupled to an output of the RF section, means for producing a voltage indicative of the strength of the signal at an output of the channel filter, means for scanning the signal strength voltage associated with each of the received carrier waves and determining which carrier wave has the greater (or greatest) signal strength and means for locking the injection frequency to the mixer so that the RF section locks onto the carrier wave which had the greater (or greatest) strength when the signal strength voltages were scanned.

The advantages of the present invention over the known systems and possible modifications thereof are that the radio receiver only utilizes one narrow bandwidth channel filter to receive spaced carrier and quasi-synchronous area coverage systems. The switching of the signal is done in those parts of the radio receiver where one does not have interference and/or intermodulation problems.

A further advantage of the radio receiver in accordance with the present invention is that it will enable a regular spacing of the carrier wave frequencies within a channel to be carried out as compared with an irregular spacing which is used at present to avoid beat frequency problems. This will enable the overall bandwidth of the area coverage signals to be reduced by 5.5 kHz and thereby enable true 25 kHz channelling to become possible.

DESCRIPTION OF THE DRAWINGS

The present invention will now be explained and described, by way of example, with reference to the accompanying drawings, wherein.

DESCRIPTION OF THE PREFERRED EMBODIMENT

Figure 1:
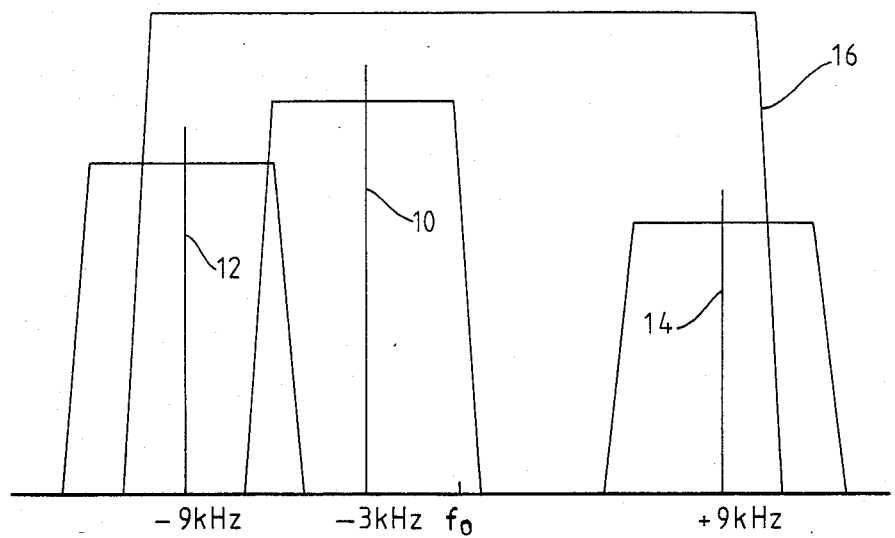
FIG. 1 illustrates the carrier frequency arrangement and response of a known system.

Referring to FIG. 1, there is shown the distribution of transmitted carrier wave frequencies 10, 12 and 14 in a known spaced carrier area coverage system and the response curve 16 of a known radio receiver. The amplitudes of the three carrier waves are intended to indicate the strength of the respective signals as received at an arbitrary receiver in the area covered by the system.

Ignoring the IF response curve 16 for the moment: In the area coverage system exemplified there are three transmitters each operating on its own carrier wave frequency located within a 25 kHz channel, the modulation signal on each carrier wave is synchronized with that on the other carrier waves so that information from all three transmitters can be demodulated without any interference problems from the respective modulation signals.

The carrier waves 10, 12 and 14 are distributed irregularly with respect to the center frequency $f_o$ of the 25 kHz channel. Using a notation of a minus sign and a plus sign indicating frequencies below and above the center frequency $f_o$, respectively, then the carrier waves 10, 12 and 14 are at −3 kHz, −9 kHz and +9 kHz, respectively, with respect to the center frequency $f_o$. The selection of the frequencies for the carrier waves 10, 12 and 14 is such that the primary beat frequencies between them are 6 kHz, 12 kHz and 18 kHz. All of which frequencies are outside the bandwidth of the audio amplifier of the known receiver. The carrier waves 10, 12 and 14 are amplitude modulated with the sidebands being typically ±3 kHz. It will be noted that the lower sideband of the carrier wave 10 overlaps the upper sideband of the carrier wave 12. Although not illustrated a carrier wave of +3 kHz could be used instead of the −3 kHz one. Also, if only two transmitters are used then generally their frequencies are +9 kHz and −9 kHz.

The known type of mobile radio receiver is tuned to receive all three carrier waves and their sidebands, the actual strength of the signals depending on the location of the receiver with respect to the respective transmitter aerials. The channel filter has a bandwidth of typically ±10 kHz so that inevitably part of the lower sideband of the carrier wave 12 and part of the upper sideband of the carrier wave 14 are omitted from the signal passed by the channel filter. Furthermore the known system, which works satisfactorily, is subject to unwanted receiver noise because of the relatively wide bandwidth of the channel filter in order to receive all three signals. Also, as the sidebands overlap the 25 kHz channel, this means that it is not possible to use the adjacent higher and lower channels which causes difficulties in allocating channel frequencies in a particular geographical area.

Figure 2:
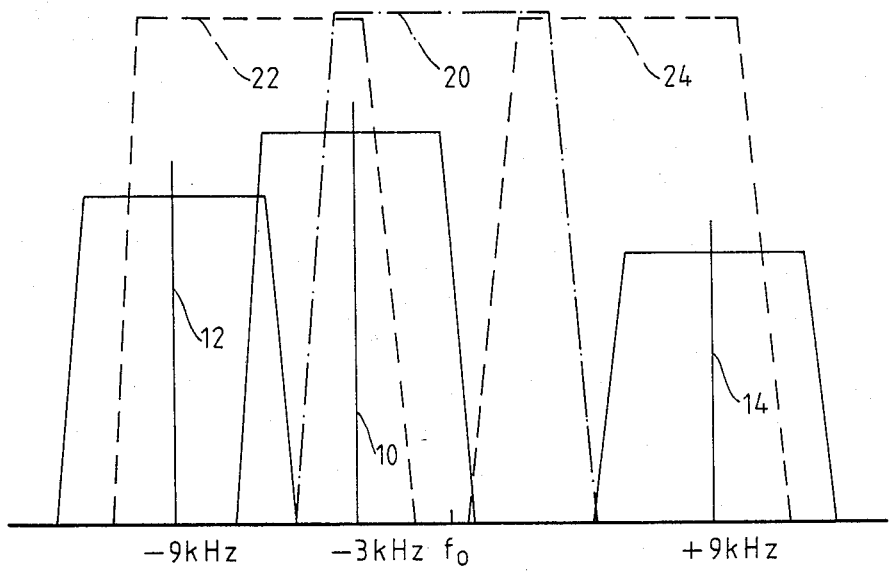
FIG. 2 illustrates the application of the receiver in accordance with the present invention to an existing area coverage system.

The receiver in accordance with the present invention overcomes some of these problems because instead of selecting all the carrier wave signals and their sidebands within a channel, it selects only the strongest signal at a particular instant, such as at switch-on and remains locked to that frequency until its strength falls by a predetermined amount and/or a particular transmission ceases. By selecting only one of the three carrier waves rather than all three as in the known receiver, then the noise-bandwidth of the channel filter can be ±3.75 kHz so a great deal of the unwanted receiver noise can be avoided. This situation is illustrated in FIG. 2 where the same reference numerals as used in FIG. 1 have been used to identify the same features. The channel filter characteristic curves 20, 22 and 24 of a nose-bandwidth of ±3.75 kHz are arranged regularly within the 25 kHz channel rather than centered on a respective transmitted carrier wave. Nevertheless, depending on which of the three signals is selected by the receiver at least one sideband plus carrier of a particular carrier wave is passed by the channel filter.

Figure 3:
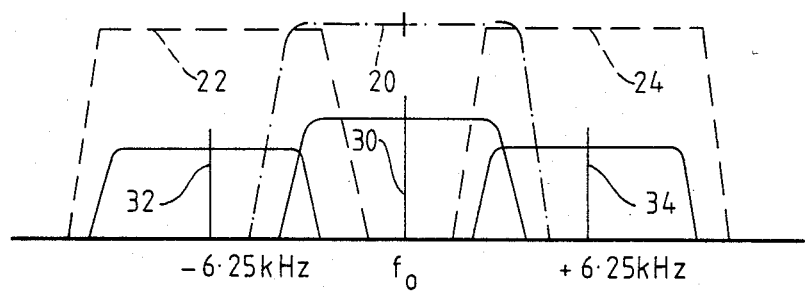
FIG. 3 illustrates a symmetrical carrier frequency spacing which is possible with the radio receiver made in accordance with the present invention.

The radio receiver in accordance with the present invention will also permit the introduction of a spaced carrier area coverage system in which the transmitted carrier waves 30, 32 and 34 can be regularly spaced for example at $f_o$, −6.25 kHz and +6.25 kHz as shown in FIG. 3. The theoretical beat frequencies of such regularly spaced carrier waves are 6.25 kHz and 12.50 kHz all of which lie outside the bandwidth typically 200 Hz to 3.0 kHz of the audio amplifier of the receiver. Additional protection against the 12.50 kHz beat note is provided by IF selectivity. By being able to space the carrier waves regularly as illustrated then the entire area coverage signals are contained within a 25 kHz channel with a margin of the order of 1 kHz at each end. This means that the frequency spectrum can be used more effectively because adjacent channels, rather than alternate channels, can be allocated in a particular geographical area.

Also with the regular spacing of the carrier wave frequencies, there is no obligation on the modulation signals being synchronized, and, as is evident from comparing FIGS. 2 and 3, the change from irregular to regular spacing of carrier waves will involve no change to the channel filter characteristic.

Figure 4:
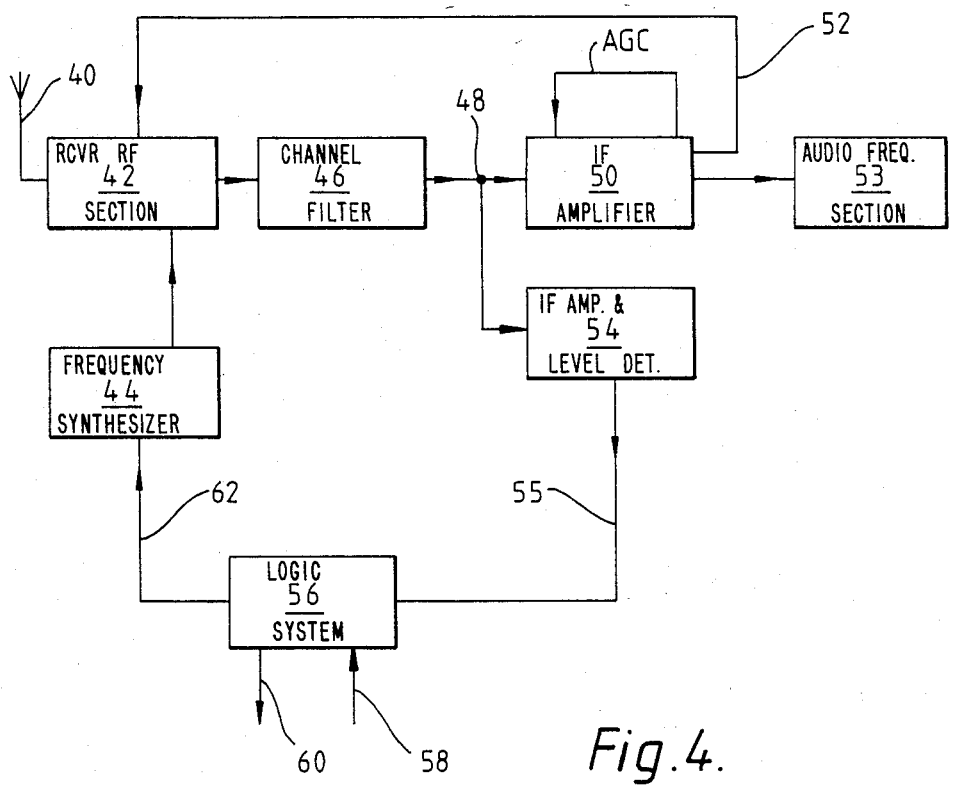
FIG. 4 is a block schematic circuit diagram of the relevant part of a radio receiver made in accordance with the present invention.

FIG. 4 illustrates a block schematic circuit diagram of an embodiment of the relevant part of a radio receiver made in accordance with the present invention.

A signal from an aerial 40 passes to a conventional front end 42 which comprises an R.F. amplifier with R.F. selectivity components and a mixer. A local oscillator conveniently in the form of a frequency synthesiser 44 provides an injection signal to the mixer (not shown) in the front end 42. The signal from the mixer is applied to a channel filter 46 from which the IF signal is derived. The amplitude of the IF signal at the output of the channel filter 46 varies with the amplitude of the signal received at the aerial 40, for convenience of description the output of the filter 46 will be identified as the node 48. The channel filter 46 has a noise-bandwidth of ±3.75 kHz on an IF frequency of 10.7 MHz.

An IF amplifier 50 is connected to the node 48 in order to derive the modulation signal by way of a conventional audio frequency section 53. The IF amplifier 50 may be regarded as being conventional although it is necessary to ensure that an automatic gain control (AGC) signal is applied to a point in the IF amplifier 50 such that it has no effect on the signal at the node 48, that is, it does not compress this signal. As is conventional a delayed AGC signal is applied via a line 52 to the front end 42 in order to maintain the signal at the mixer constant to avoid non-linearity.

The signal at the node 48 is applied to an IF amplifier 1 level detector 54 which serves to measure the amplitude of the signal at the node 48. For optimum results, the output from the IF amplifier 1 level detector 54 is of logarithmic form so that there is adequate dynamic range and also the measurements can be expressed in decibels, dB. Conveniently the IF amplifier 1 level detector 54 comprises an integrated circuit type CA 3089 supplied by the Radio Corporation of America, with the output taken from the tuning meter output.

The output of the IF amplifier 1 level detector 54 is a voltage indicative of the signal strength. This voltage has frequency components up to a few kHz because of the presence of the modulation voltage which has been distorted by the logarithmic operation applied to the signal at the node 48. The signal strength voltage is applied via a line 55 to a logic system 56 which may be a dedicated circuit but in the present embodiment comprises a programmed micro-computer based on a microprocessor Intel/Philips Type 8048, together with ancillary components. A flow-chart for the operation of the logic system 56 is illustrated in and will be described with reference to FIG. 5 of the accompanying drawings.

The logic system 56 includes an integrator for integrating the signal strength voltage over a period of time to avoid the effects of modulation. The integrated signal is applied to an analog-to-digital converter to convert the signal into a form suitable for processing in the micro-computer.

Figure 5:
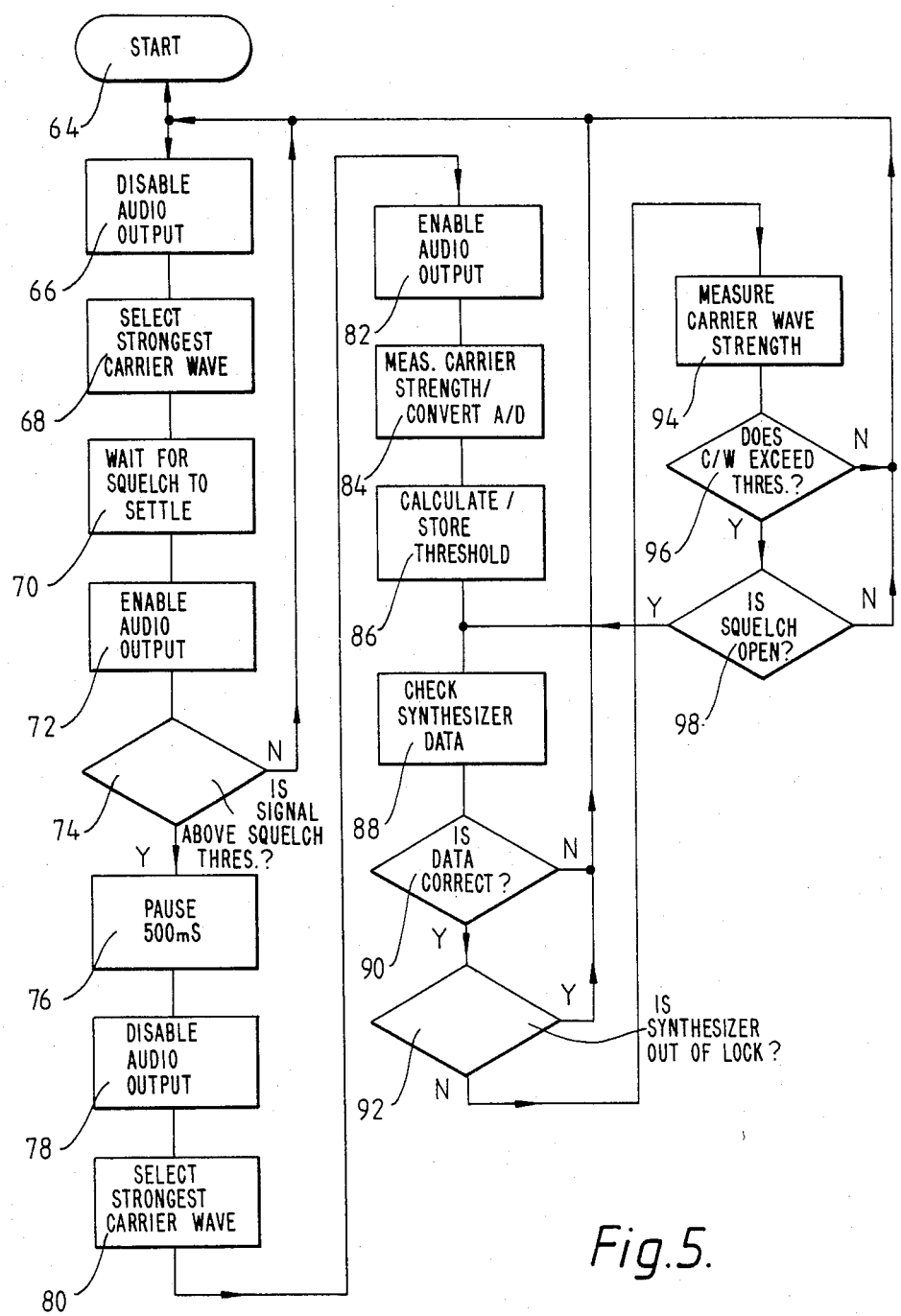
FIG. 5 is a flow-chart illustrating the basic operating steps of the micro-computer used in a logic system in the radio receiver illustrated in FIG. 4.

Before discussing FIG. 5 in detail the operations to be carried out by the logic system 56 will be summarized. Once a signal is received which is above a squelch threshold then a signal is applied to the logic system 56 via an input 58. The logic system scans the strength of the signal associated with each carrier wave by applying a frequency control signal to the frequency synthesiser 44 so that each carrier wave is selected in turn for about 5 milliseconds (mS). This is done by instructing the synthesizer 44 to increment or decrement by a reference of 6.25 kHz, the injection frequency and hence the receiver passband, which passbands are indicated by the reference numerals 20, 22 and 24 in FIGS. 2 and 3. From the measurements, the biggest signal is selected. A check is made after 500 mS to see if the decision is a good one and if not the carrier wave then having the biggest signal is selected and the injection frequency to the mixer in the front end 42 is locked to the carrier wave. The receiver remains locked to that carrier wave frequency, irrespective of whether another or all of the other input signals has or have a greater strength, unless the signal strength falls by more than a predetermined amount in which case the signal strength voltages are rescanned and provided that one or more of them are above the squelch threshold a selection is made and the receiver is locked to that frequency. The output line 60 is used to enable/disable the audio output of the receiver.

Preferably the frequency control signal on a line 62 from the logic system 56 to the frequency synthesizer 44 is a parallel digital signal, but if necessary a serial feed may also be used. In either case the synthesizer 44 may comprise a Phillips type HEF 4750V synthesizer, and in a situation where a serial feed is acceptable, then a Philips type HEF 4751V divider may be used in conjunction with the synthesizer. The signal on the line 62 instructs which multiple of the synthesizer reference frequency of 6.25 kHz should be applied as an injection frequency to the mixer in the front end 42.

Referring now to the flow-chart shown in FIG. 5, the various operating steps are represented by a rectangle and the decision steps are represented by a diamond, the letter N being used to represent a negative answer to the question posed while the letter Y represents an affirmative answer to the same question.

The block 64 represents the entry situation. The next step represented by the block 66 is to disable the audio output so that spurious noises are not supplied to a loudspeaker or other transducer connected to the output of the audio section 53 (FIG. 4). The block 68 represents the step of selecting the strongest of the carrier waves and their associated sidebands. This is done using a sub-routine in which each carrier wave is sampled for 5 mS and a signal strength voltage is obtained, these voltages are compared with each other and the strongest one is selected. The time taken to carry out this operation is of the order of 16 mS.

The block 70 represents the step of waiting for the squelch circuitry to settle. The block 72 represents the step of enabling the audio output. The block 74 asks the question "Is the signal above the squelch threshold?". If the answer is in the affirmative then the flow-chart continues to the block 76. However, if it is in the negative then the steps identified by the blocks 66 to 74 are repeated until an affirmative answer is received. The reason why a negative answer may arise is that none of the received signals is of such a strength as to exceed the squelch threshold. The overall time for carrying out the steps denoted by the blocks 66 to 72 is of the order of 20 mS.

Returning to the block 76, this instructs that the program pause for 500 mS during which time the selected carrier wave is received and the modulation reproduced. The reason for the pause is that it is possible that not all of the transmitters may have turned-on simultaneously due, for example to line delays, and therefore the initially selected strongest carrier wave may not in fact be the strongest one. In order to check this, the blocks 78, 80 and 82 repeat the steps previously described with reference to the blocks 66, 68 and 72. Having decided on the strongest of the incoming carrier waves, its strength is measured and a digital value is produced, this operation is indicated by the block 84. The block 86 denotes the step of storing in a memory a threshold value obtained by subtracting a constant number from this digital value.

The next step, block 88, is to check that the correct data is being presented to the synthesizer. As part of this routine which is regarded as an optional, housekeeping one, a decision has to be made on whether the data supplied is correct, block 90. If the answer is in the negative (N) then one repeats the sequence of operational steps and decisions beginning at the block 66. In the case of an affirmative answer (Y) one then checks to see if the synthesizer is out of lock, block 92. If it is then the sequence is repeated at the block 66. If the synthesizer is in lock then the next step, block 94, is to measure the signal strength.

As a result of monitoring the signal strength, a check is made as to whether the signal strength exceeds the threshold value which was stored during block 86, this is block 96. A negative answer (N), which may arise due to fading of the signal from the selected transmitter, causes the sequence of steps beginning at block 66 to be repeated. In the case of an affirmative answer (Y) the sequence proceeds to block 98 which indicates the making of a check as to whether the squelch is open. If it is then the sequence of steps commencing at block 88 is repeated, alternatively if it is not, for example because the incoming signal is too weak or non-existent, then the whole sequence repeats beginning at the block 66.

These operations ensure that once a signal has been received, the receiver is locked onto the strongest carrier wave until its strength decreases by more than a predetermined amount or below the squelch threshold. The sampling rate is typically 200 times per second and each sample measures the average signal strength over substantially 5 mS.

Figure 6:
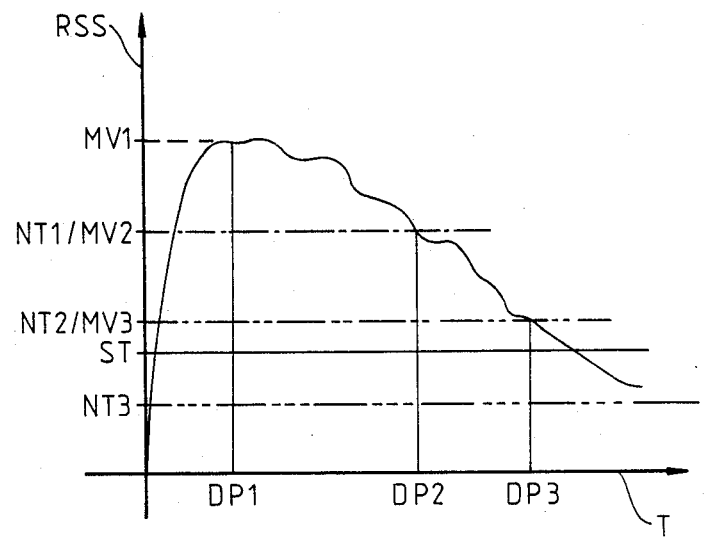
FIG. 6 serves to illustrate the situation when the received signal strength falls by more than a predetermined amount below its measured value thereby causing the receiver to scan again the incoming signals.

FIG. 6 illustrates diagrammatically the strength of the incoming signal, the setting of a threshold value for that signal; the decision points and the squelch threshold. The curve shown is of Received Signal Strength (RSS) against Time (T). The line ST parallel to the abscissa indicates the squelch threshold. Below the line ST the signal strength is regarded as being so small so that the squelch comes into operation.

In this example, following the commencement of transmission the receiver locks on to a carrier wave having a strength MV1 at decision point DP1. In consequence a threshold value NT1 is stored (block 86, FIG. 5). As the signal falls to NT1, then the receiver scans the received signals and, for example say locks on to the same signal because it has the greatest strength (MV2) and is still above the squelch threshold ST. This second point is indicated as decision point DP2. A new threshold point NT2 is stored. In view of the fact that the signal is still falling and reaches NT2, then a new measured value MV3 is obtained, decision point DP3. The new theshold NT3 is stored, but as this is below the squelch threshold ST then the squelch threshold ST becomes effective as the signal strength continues to fall. Accordingly, the receiver returns to a standby status until an incoming signal having a strength exceeding ST is received, and consequently, the sequence of steps beginning at block 64 of FIG. 5 commences.

The present invention has been described with respect to an amplitude modulated spaced carrier area coverage system which operates typically at V.H.F. However, the receiver could be used with a frequency modulated system with more widely spaced carrier waves in a wider channel. A consequence of this is that the frequency synthesizer is switched in 12.5 kHz steps rather than 6.25 kHz steps as with A.M. in order to avoid sideband overlap. This doubling of the size of the steps can be achieved either by changing the software of the logic system or the synthesizer reference from 6.25 kHz to 12.5 kHz.

I claim:

1. In a method for receiving signals in a spaced carrier area coverage system having at least two transmitters with modulated carrier waves having different carrier frequencies in a given frequency channel, wherein the method includes receiving signals in said channel, mixing said received signals with oscillations of a local oscillator to produce intermediate frequency signals in a given frequency band, and demodulating said intermediate frequency signals to produce output signals; the improvement further comprising the steps of:

a. limiting said intermediate frequency signals to a band width approximately equal to the band width of each one of said modulated carrier waves,
  b. determining the signal strengths of each of said limited band width intermediate frequency signals,
  c. selectively varying the frequency of said local oscillator to sequentially convert the signals received from said transmitters to the frequency band of said intermediate frequency signals,
  d. scanning the signal strengths of each of said limited band width intermediate frequency signals to determine the received signals having the greatest signal strength,
  e. adjusting the frequency of said local oscillator to select output signals from said coverage system, said selected output signals corresponding to received signals of the greatest signal strength as determined in d, when the signal strength of at least one of said limited intermediate frequency signals corresponding to at least one transmitter is greater than a first given threshold,
  f. determining a second threshold as a function of the strength of the signal determined in d and adjusted to in e,
  g. locking the frequency of said local oscillator onto a value so as to lock onto the transmitter signal of greatest strength determined in d until the signal strength of said limited intermediate frequency signal falls below said second threshold, and
  h. repeating said steps d–g of scanning, adjusting the frequency of said local oscillator, determining a second threshold and locking, when the signal strength of said limited band width intermediate frequency signal to which said local oscillator has been locked, falls below said second threshold.

2. The method of claim 1 wherein an audio output is produced from said output signals, and comprising the further step of disabling said audio output during said step of scanning.

3. The method of claim 1 wherein said step of scanning comprises a first scanning step for selecting the transmitter with the strongest carrier wave followed by a second scanning step to select the transmitter with the strongest carrier wave, whereby said step of adjusting is effected if the same transmitter is selected in said first and second steps of scanning.

4. The method of claim 3 further comprising a step of pausing between said first and second scanning steps.

5. The method of claim 3 further comprising repeating said first step of scanning if none of the received signals is above said first threshold following said first step of scanning.

* * * * *